(12) United States Patent
Partington et al.

(10) Patent No.: US 7,014,946 B2
(45) Date of Patent: Mar. 21, 2006

(54) MODULAR RACK BATTERY SYSTEM

(75) Inventors: Kenneth Michael Partington, Lancashire (GB); Rhodri Evans, Gwent (GB)

(73) Assignee: Hawker Batteries Limited, Bristol (GB)

( * ) Notice: Subject to any disclaimer, the term of this patent is extended or adjusted under 35 U.S.C. 154(b) by 381 days.

(21) Appl. No.: 10/289,133

(22) Filed: Nov. 6, 2002

(65) Prior Publication Data

US 2003/0143455 A1    Jul. 31, 2003

(51) Int. Cl.
*H01M 2/10* (2006.01)

(52) U.S. Cl. .................... 429/99; 429/159; 429/187

(58) Field of Classification Search ............... 429/97, 429/99, 100, 159, 187
See application file for complete search history.

(56) References Cited

U.S. PATENT DOCUMENTS

| | | | | |
|---|---|---|---|---|
| 4,042,762 A | * | 8/1977 | Hakarine | 429/187 |
| 5,492,779 A | * | 2/1996 | Ronning | 429/176 X |
| 6,265,091 B1 | * | 7/2001 | Pierson et al. | 429/100 X |
| 6,475,659 B1 | * | 11/2002 | Heimer | 429/159 X |
| 6,841,293 B1 | * | 1/2005 | Dreulle et al. | 429/99 |

FOREIGN PATENT DOCUMENTS

| | | |
|---|---|---|
| DE | 200 00 776 | 7/2000 |
| JP | 11-67178 | * 3/1999 |
| JP | 11067178 | 3/1999 |
| WO | 00/79619 | 12/2000 |

OTHER PUBLICATIONS

International Search Report for PCT/US 03/02243, Sep. 2003.

* cited by examiner

*Primary Examiner*—Stephen J. Kalafut
(74) *Attorney, Agent, or Firm*—Myers Bigel Sibley & Sajovec, PA

(57) ABSTRACT

Devices include a plurality of batteries connectable in series and arranged in vertically stacked configurations. Each of the batteries includes opposite first and second lateral faces and a positive terminal and a negative terminal adjacent the first face. The first and second lateral faces each have nesting topography thereon. A first substantially vertically oriented sideplate has nesting topography thereon configured to receive the nesting topography of the first faces of the batteries and an electrical connector connected to a positive terminal of one battery and a negative terminal of an adjacent battery. A second substantially vertically oriented sideplate has nesting topography configured to receive the nesting topography of the second faces of the batteries.

21 Claims, 2 Drawing Sheets

MODULAR RACK BATTERY SYSTEM

RELATED APPLICATION

This application claims the benefit of British Patent Application No. 0201914.2, filed Jan. 29, 2002.

FIELD OF THE INVENTION

The present invention relates generally to batteries and, more particularly, to devices for connecting and stacking batteries.

BACKGROUND OF THE INVENTION

Rack mounted power supply batteries, including rack mounted power supply batteries for telecom use, typically have non-modular designs. Often, the batteries which ordinarily have a rectangular shape, are mounted vertically on a shelf in a horizontal arrangement. Electrical connections can be made after all the batteries are in place.

It may be difficult to make electrical connections in such an arrangement due to a lack of space from the battery to the steel cabinet and the risk of touching connections and shorting the electrical connections between batteries. Furthermore, horizontally arranged batteries may produce heavy loads on the underlying shelf, causing it to bow significantly.

SUMMARY OF THE INVENTION

In view of the above discussion, devices for stacking and connecting batteries are provided. In certain embodiments, the device includes a plurality of batteries connectable in series and arranged in a vertically stacked configuration. Each of the batteries includes opposite first and second lateral faces and a positive terminal and a negative terminal adjacent the first face. The first and second lateral faces each have nesting topography thereon. A first substantially vertically oriented sideplate has nesting topography thereon configured to receive the nesting topography of the first faces of the batteries and an electrical connector connected to a positive terminal of one battery and a negative terminal of an adjacent battery. A second substantially vertically oriented sideplate has nesting topography configured to receive the nesting topography of the second faces of the batteries.

In other embodiments, a battery is provided having a substantially rectangular housing having opposed lateral side faces, a positive terminal and a negative terminal, the terminals being located adjacent the first face, each of the first and second faces having one of a substantially horizontally disposed groove and rib adapted to mount on and nest with a complimentary side plate.

DETAILED DESCRIPTION OF THE INVENTION

Figure 1:
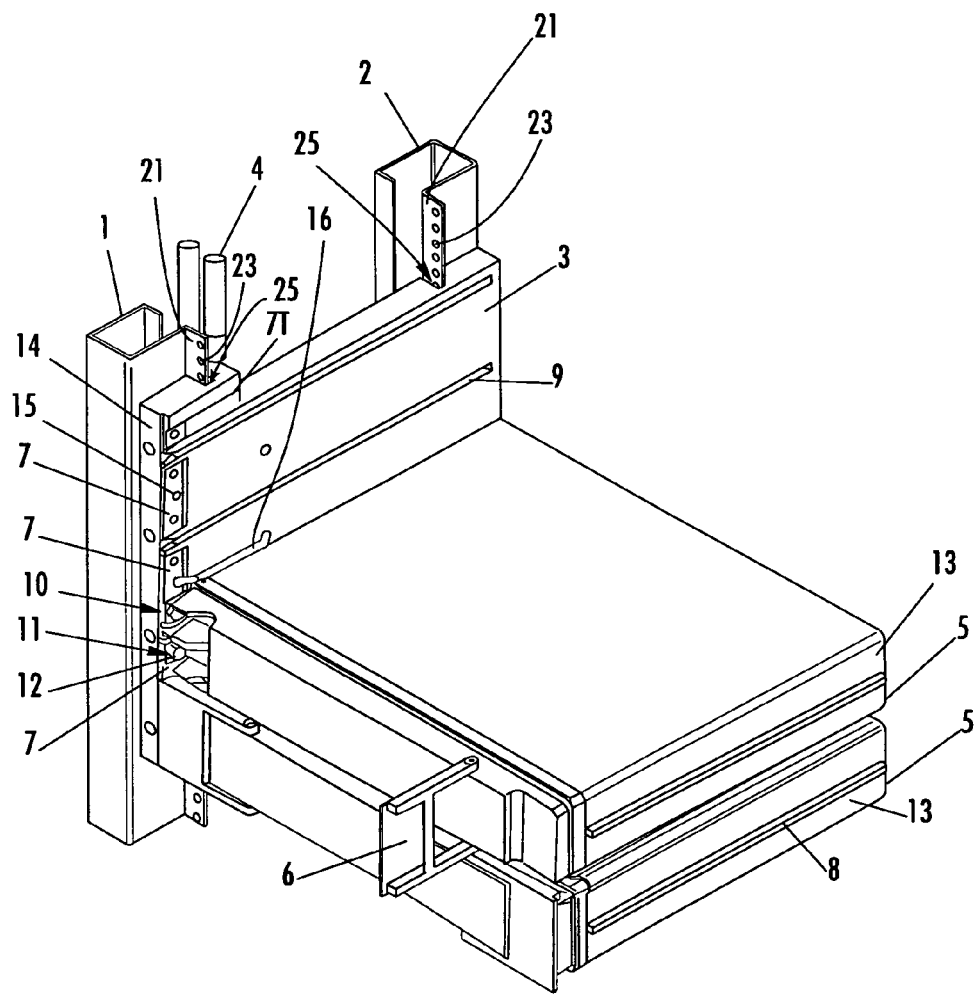
FIG. 1 is a partial perspective view of a device according to embodiments of the invention with outside plate removal.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

The present invention relates to rack mounted batteries, including, but not limited to, standby or uninterruptible power supplies for telecom usage. Rack mounted batteries according to embodiments of the present invention may be installed and connected to one another with increased speed and less difficulty than current configurations.

Typical battery sizes can include 24 or 48 volt arrangements, and the size of the battery can be assigned according to the specific cabinet architecture employed. This can include 19 or 23 inch installation systems or miscellaneous racks and cabinet architectures such as those defined by and constructed in accordance with the engineering requirements published by the European Telecommunication Standard (ETSI). The batteries may be valve-regulated lead acid (VRLA) batteries, although other types of batteries known to those of skill in the art may be used, including zinc-carbon batteries, alkaline batteries, nickel-cadmium batteries, nickel-metal hydride batteries, lithium-ion batteries, zinc-air batteries, zinc-mercury oxide batteries, silver-zinc batteries, and metal-chloride batteries. Typical VRLA batteries include alternating lead and lead oxide plates in an electrolyte sulfuric acid and water solution. The electrolyte solution causes a chemical reaction that produce electrons which collect on the negative terminal of the battery, thereby causing current to flow from the positive terminal to the negative terminal through an attached device. For further detail, see U.S. patent application Ser. No. 09/623,959, which issued as U.S. Pat. No. 6,602,638 on Aug. 5, 2003, which is incorporated herein by reference in its entirety.

FIG. 1 shows a 12 volt, 100 Ah battery 5 that can be connected in series with one or more batteries. For example, the battery 5 can be connected in series with a total of four 12 volt, 100 Ah (Ampere hour) monobloc batteries to form a 48 volt, 100 Ah power supply. The battery 5 is connected to a sideplate 3. The sideplate 3 shown is suitable for use in a standard nineteen inch rack cabinet with a depth of 400 mm. The batteries 5 include positive and negative terminals 10 and 11, respectively. Other sizes and numbers of batteries can be used. For example, two 12 volt batteries or three 8 volt batteries can be used to form a 24 volt power supply. Variously sized sideplates and rack cabinets can also be used.

Figure 2:
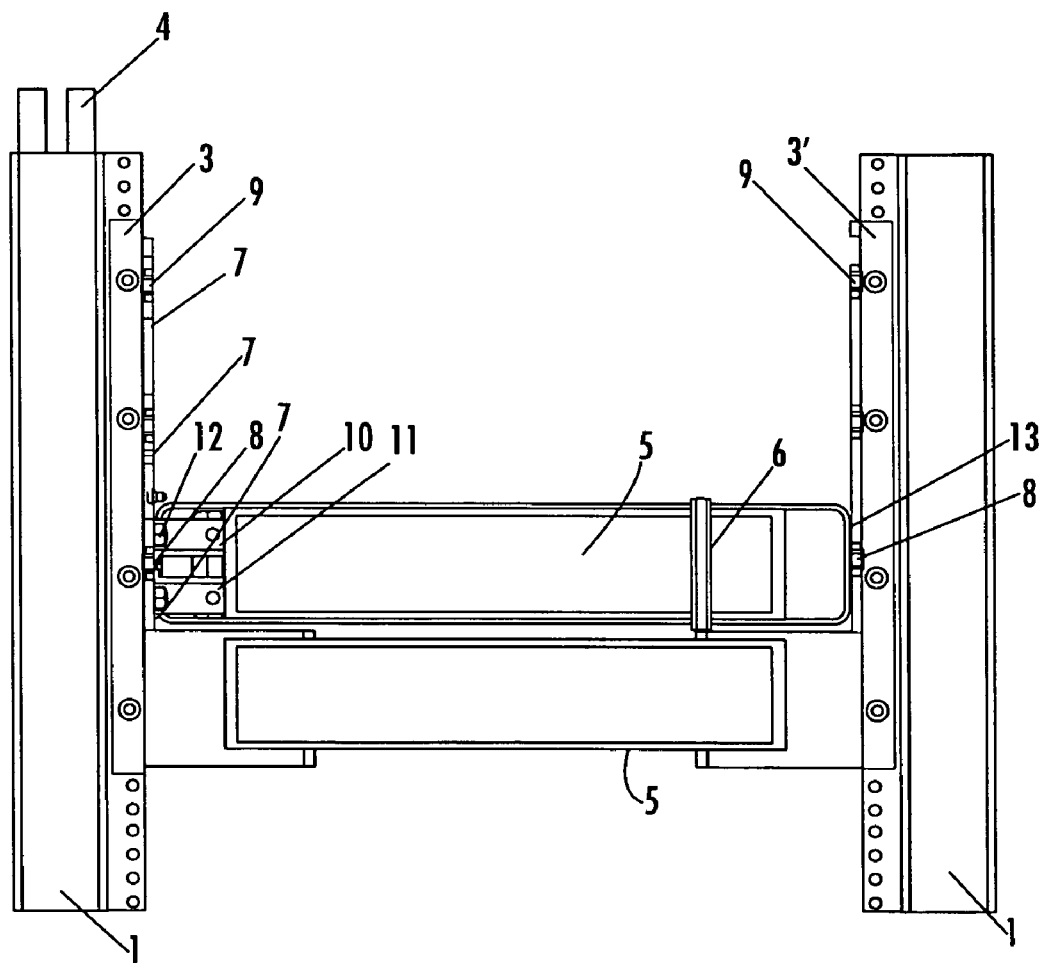
FIG. 2 is a front view of the device of FIG. 1 with both side plates shown.

The sideplate 3 is mounted between two vertically extending support members 1 and 2, which can be provided within a housing cabinet (not shown). A second sideplate 3' (shown in FIG. 2) can be mounted between a second pair of vertically extending support members (front member 1 is shown in FIG. 2) at the opposing end of the monobloc battery stack. The sideplates 3, 3' include horizontally disposed grooves 9 at regular vertical intervals.

Each of the monobloc batteries 5 is provided with ribs 8 on its vertical sides 13 which are configured to slide within the grooves 9 provided in the sideplates 3. The grooves 9 and ribs 8 guide and secure the monobloc battery between the sideplates 3. Thus, the batteries 5 are mounted at a fixed distance from one another in spaced apart, vertically stacked configuration.

Those of skill in the art will recognize that alternative embodiments of the stacking mechanisms that differ from that illustrated herein may also be suitable. For example, the grooves 9 and ribs 8 may be replaced with knobs, posts, a series of disconnected grooves and ribs or other nesting topography that prevents relative movement between the batteries 5 and the sideplates 3. Of course, the grooves 9 and ribs 8 may be reversed (i.e., the ribs being located on the sideplates and the grooves being located on the battery), as may also be the case for other examples of nesting topography.

The monobloc batteries 5 may include one or more pivoting handles 6 to assist in positioning the batteries 5 between the sideplates 3. The foldout handles 6 are movable between an extended open position and a closed position. When situated in the closed position, the foldout handles 6 can provide shielding to the positive and negative terminals 10 and 11 of alternating batteries to prevent shortages.

The sideplate 3 includes a vertical front edge 14, on which are mounted electrically conductive connectors 7. With the exception of the batteries 5 at the top and bottom of the stack, the connectors 7 are positioned such that they extend between the top portion of one monobloc battery 5 and the bottom portion of the above adjacent monobloc battery 5. The positive or negative terminal 10 or 11 of one monobloc battery 5 is electrically connected to the terminal of opposite polarity of an adjacent monobloc battery 5 by the connector 7 so that all of the batteries 5 are connected in series. The connectors 7 include an opening 15 for auxiliary wiring 16 that can be connected on the side of the connector 7 opposite the battery 5. For example, the opening 15 can connect a testing wire that electrically connects to connectors 7 to test the performance or present level of charge of a battery 5.

In the embodiments shown in FIGS. 1 and 2, the positive and negative battery terminals 10 and 11 and the connectors 7 include holes which are aligned to receive a fastening bolt 12 that electrically connect the terminals 10 and 11 to the connectors 7 utilizing a threaded bushing held captive on the connector 7. Other fastening mechanisms known to those of skill in the art, such as screws or pins, may be used, as may other electrical connection techniques. When the device shown is in place inside a cabinet, the fastening nut and bolt 12 are preferably readily accessible from the front of the cabinet.

The top connector 7T and the bottom connector (not shown) are electrically connected to terminals (such as terminals 10 and 11) of opposite polarity on the top and bottom monobloc batteries 5. The top connector 7T and the bottom connector are connected to one of a pair of conductive cables 4 which transfer the battery power out of the device.

The side plates 3 and 3' can be installed into a cabinet, for example, on vertical support members 1 and 2 of the cabinet. The cabinet can have dimensions of 600 mm in width by 400 mm in depth and 1600 mm in height. The side plates 3 and 3' can be configured to complement or otherwise attach to the support members 1 and 2. For example, either or both of the support members 1, 2 may have a ridge 21, and the side plates 3 and 3' may have a complementary notch 25 for receiving the ridge 21. The ridge 21 may protrude away from the support member 1, 2 and include holes 23. The notch 25 can include corresponding holes (not shown) such that the sideplates 3 and 3' can be bolted to the support members 1 and 2 through holes 23 and the corresponding holes on notch 25.

In the illustrated embodiment, one side plate 3 includes battery connectors 7 while the opposing side plate 3' (in FIG. 2) does not. The side plates 3 and 3' can be suitable to modular cabinet arrangements with facilities to accept batteries 5, which can be custom designed. Various sizes of batteries 5 can be used, including batteries with dimensions that are a multiple or division of modular units (HU/U), such as 2, 2.5 or 3 HU/U in height. One unit (HU/U) is equivalent to 1.75 inches (44.45 mm) and is an international standard for rack mounted electrical equipment. Typically, the side plates 3, 3' will be between about 14 and 21 inches in height, and the connectors 7 attached thereto will be between about 2.5 and 3 inches in height.

In a further embodiment, the battery 5 may be arranged such that terminals 10 and 11 of opposite polarity are located at opposite ends of the battery 5. In such embodiments, both side plates 3 can include battery connectors 7 which may allow the multiple batteries 5 to be connected in either a series or parallel configuration.

The sideplates 3 can be electrically wired to incoming and outgoing cables 4 and any required auxiliary connections prior to installation of the batteries 5. The connections may be more easily made as a result of increased space prior to battery installation. The batteries 5 can then be slid into place and fastened to connectors 7. The connectors 7 may be shielded from contact with ground during this process.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A device for stacking and connecting batteries, the device comprising:
   a plurality of batteries connectable in series and arranged in a vertically stacked configuration, each of the batteries comprising opposite first and second lateral faces, a positive terminal and a negative terminal, the terminals being located adjacent the first face, the first and second lateral faces each having nesting topography thereon;
   a first substantially vertically oriented sideplate having nesting topography thereon configured to receive the nesting topography of the first faces of the batteries and an electrical connector connected to a positive terminal of one battery and a negative terminal of an adjacent battery; and
   a second substantially vertically oriented sideplate having nesting topography configured to receive the nesting topography of the second faces of the batteries.

2. The device of claim 1, wherein the nesting topography of the battery first face comprises one of a rib and a groove, and wherein the nesting topography of the first sideplate comprises the other of a groove or a rib.

3. The device of claim 1, wherein the nesting topography of the battery first face comprises a rib extending substantially horizontally.

4. The device of claim 1, further comprising a handle attached to at least one of the batteries.

5. The device of claim 4, wherein the handle is configured to provide shielding for at least one of the positive and negative terminals of a battery.

6. The device of claim 1, further comprising a set of first and second elongate vertically extending members for mounting the first and second sideplates.

7. The device of claim 1, the electrical connector comprising apertures adapted to receive a connecting member that connects the positive and negative terminals to the electrical connector.

8. The device of claim 1, the electrical connector comprising an aperture adapted to receive auxiliary wiring.

9. The device of claim 1, further comprising a set of first and second conductive cables for transferring power, the first conductive cable connectable to a positive terminal on one of the batteries, and the second conductive cable connectable to a negative terminal on another of the batteries.

10. The device of claim 1, wherein the batteries together comprise a 48 volt standby power supply.

11. The device of claim 1, wherein the batteries together comprise a 24 volt standby power supply.

12. The device of claim 1, wherein each of the batteries is a 12 volt battery.

13. The device of claim 1, wherein each of the batteries have vertical dimensions that are a multiple or division of modular units (HU/U).

14. The device of claim 1, wherein each of the batteries have horizontal dimensions suitable for a 19 inch rack architecture.

15. The device of claim 1, wherein each of the batteries have horizontal dimensions suitable for a 23 inch rack architecture.

16. A battery, comprising:
a substantially rectangular housing having opposed lateral side faces including opposite first and second faces, a positive terminal and a negative terminal, the terminals being located on one of the lateral side faces adjacent the first face, each of the first and second faces having one of a substantially horizontally disposed groove and rib adapted to mount on and nest with a complimentary side plate.

17. The battery of claim 16, wherein the battery is a 12 volt battery.

18. The battery of claim 16, wherein the battery has horizontal dimensions suitable for a 19 inch rack architecture.

19. The battery of claim 16, wherein the battery has horizontal dimensions suitable for a 23 inch rack architecture.

20. The battery of claim 16, wherein the battery has vertical dimensions that are a multiple or division of modular units.

21. The battery of claim 16, further comprising an alternating series of lead-containing positive and negative electrode plates and an electrolyte solution within the housing.

* * * * *